US009682681B1

(12) United States Patent
Patel et al.

(10) Patent No.: US 9,682,681 B1
(45) Date of Patent: Jun. 20, 2017

(54) ADAPTIVE SIDE TORSO AIRBAG

(71) Applicant: Ford Global Technologies, LLC, Dearborn, MI (US)

(72) Inventors: Deepak Patel, Canton, MI (US); Zhibing Deng, Northville, MI (US); Brian Robert Spahn, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/168,517

(22) Filed: May 31, 2016

(51) Int. Cl.
| | | |
|---|---|---|
| *B60R 21/239* | (2006.01) | |
| *B60R 21/0136* | (2006.01) | |
| *B60R 21/015* | (2006.01) | |
| *B60R 21/231* | (2011.01) | |
| *B60R 21/2338* | (2011.01) | |

(52) U.S. Cl.
CPC ........ *B60R 21/239* (2013.01); *B60R 21/0136* (2013.01); *B60R 21/01512* (2014.10); *B60R 21/2338* (2013.01); *B60R 21/23138* (2013.01); *B60R 2021/2395* (2013.01); *B60R 2021/23384* (2013.01)

(58) Field of Classification Search
CPC .............. B60R 21/239; B60R 21/0136; B60R 21/01512; B60R 21/2338; B60R 21/23138; B60R 2021/2395; B60R 2021/23384
USPC ................................ 280/730.1, 730.2, 743.2
See application file for complete search history.

(56) References Cited

U.S. PATENT DOCUMENTS

| | | | |
|---|---|---|---|
| 5,536,038 A * | 7/1996 | Bollaert | B60R 21/23 280/730.2 |
| 5,813,696 A | 9/1998 | Hill | |
| 5,924,721 A | 7/1999 | Nakamura et al. | |
| 6,659,499 B2 * | 12/2003 | Jenkins | B60R 21/2338 280/735 |
| 7,735,856 B2 | 6/2010 | Schlosser et al. | |
| 8,500,163 B2 * | 8/2013 | Mallinger | B60R 21/239 280/739 |
| 8,783,712 B2 * | 7/2014 | Fukushima | B60R 21/23138 280/730.2 |
| 9,327,674 B2 * | 5/2016 | Fischer | B60R 21/239 |
| 9,457,759 B2 * | 10/2016 | Sugimoto | B60R 21/23138 |
| 2007/0024033 A1 * | 2/2007 | Suzuki | B60R 21/231 280/730.2 |
| 2009/0250912 A1 * | 10/2009 | Libby | B60R 21/233 280/730.1 |

(Continued)

FOREIGN PATENT DOCUMENTS

| | | |
|---|---|---|
| CN | 101570172 B | 3/2013 |
| JP | 2004189187 A | 7/2004 |

(Continued)

*Primary Examiner* — Darlene P Condra
(74) *Attorney, Agent, or Firm* — Frank MacKenzie; Bejin Bieneman PLC

(57) ABSTRACT

A side airbag comprises a first side, a second side, a main portion and an extension portion. The main portion has a recess in the first side. The extension portion is supported by and is in communication with the main portion. A first tether is between the main portion and the extension portion. A vent is disposed in the main portion and selectively is moveable from a closed orientation to an open orientation. A second tether extends from the second side to the recess.

9 Claims, 8 Drawing Sheets

(56) References Cited

U.S. PATENT DOCUMENTS

| | | | | |
|---|---|---|---|---|
| 2009/0309341 A1* | 12/2009 | Pausch | ............... | B60R 21/2338 280/735 |
| 2013/0334801 A1* | 12/2013 | Williams | .............. | B60R 21/239 280/739 |
| 2015/0042082 A1* | 2/2015 | Koshikawa | ........... | B60R 21/203 280/739 |
| 2015/0183393 A1* | 7/2015 | Kino | .................... | B60R 21/207 280/729 |
| 2015/0239423 A1* | 8/2015 | Hayashi | ............... | B60R 21/231 280/729 |
| 2015/0314748 A1* | 11/2015 | Mihm | ................. | B60R 21/2338 280/730.2 |
| 2015/0343980 A1* | 12/2015 | Hotta | .................. | B60R 21/207 280/728.3 |
| 2016/0368449 A1* | 12/2016 | Fujiwara | ............... | B60R 21/231 |
| 2017/0008479 A1* | 1/2017 | Aranzulla | ........... | B60R 21/2338 |

FOREIGN PATENT DOCUMENTS

| | | | |
|---|---|---|---|
| JP | 2004276808 A | 10/2004 | |
| JP | 5291998 B2 | 6/2013 | |

* cited by examiner

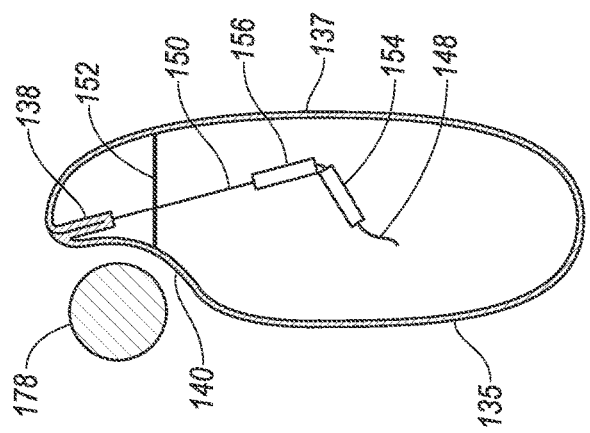
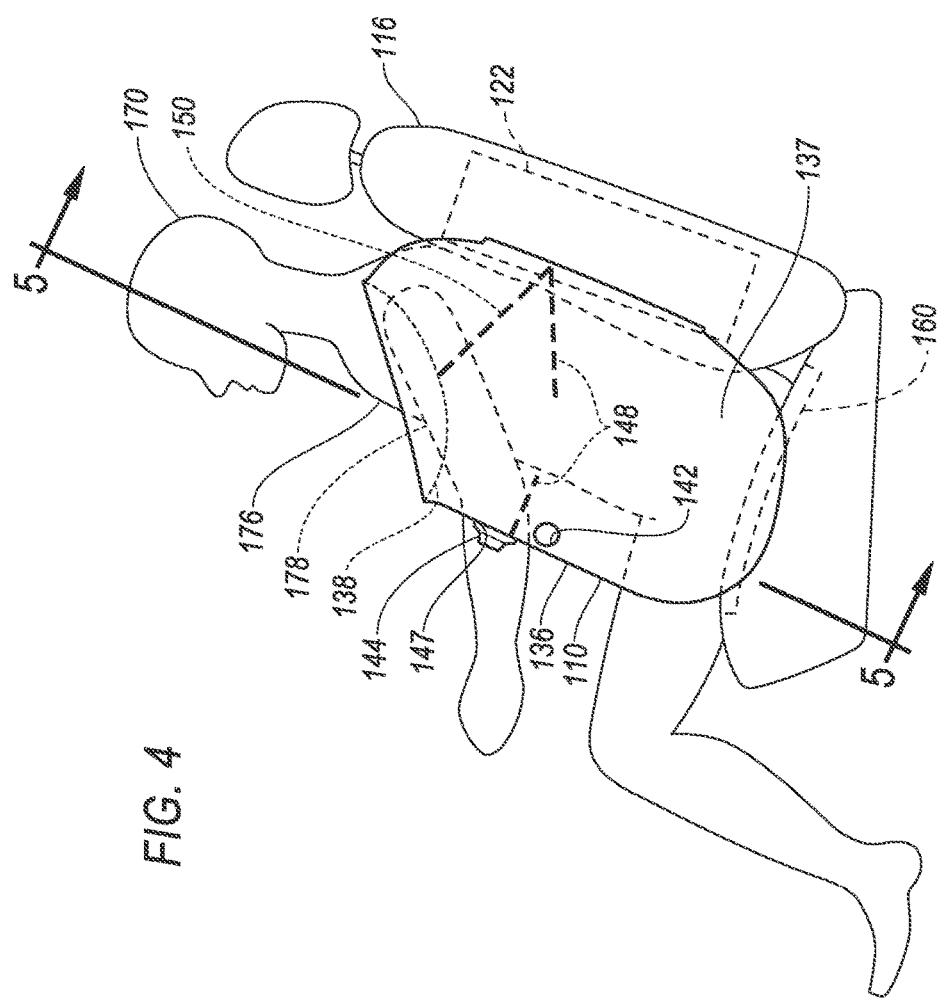

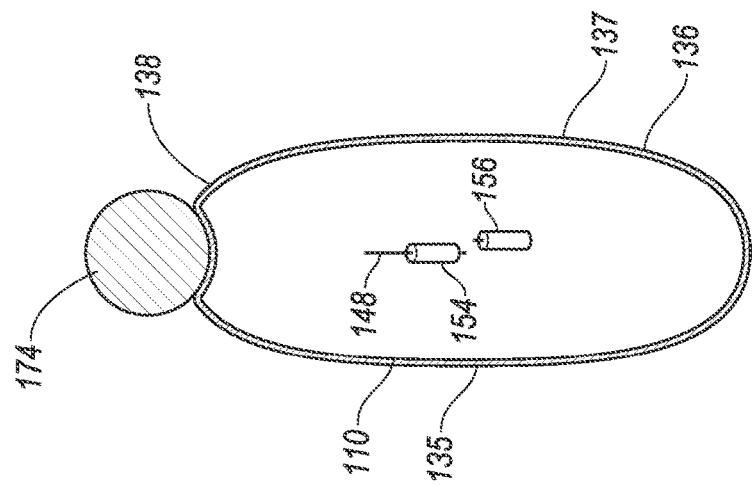
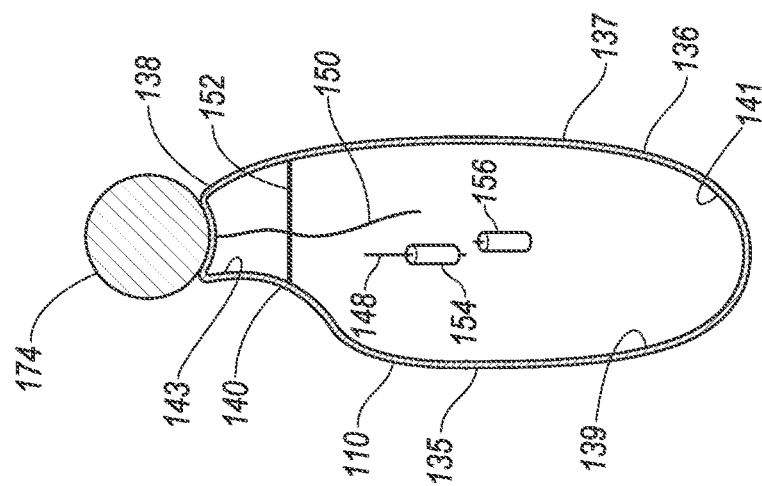
FIG. 7
FIG. 8

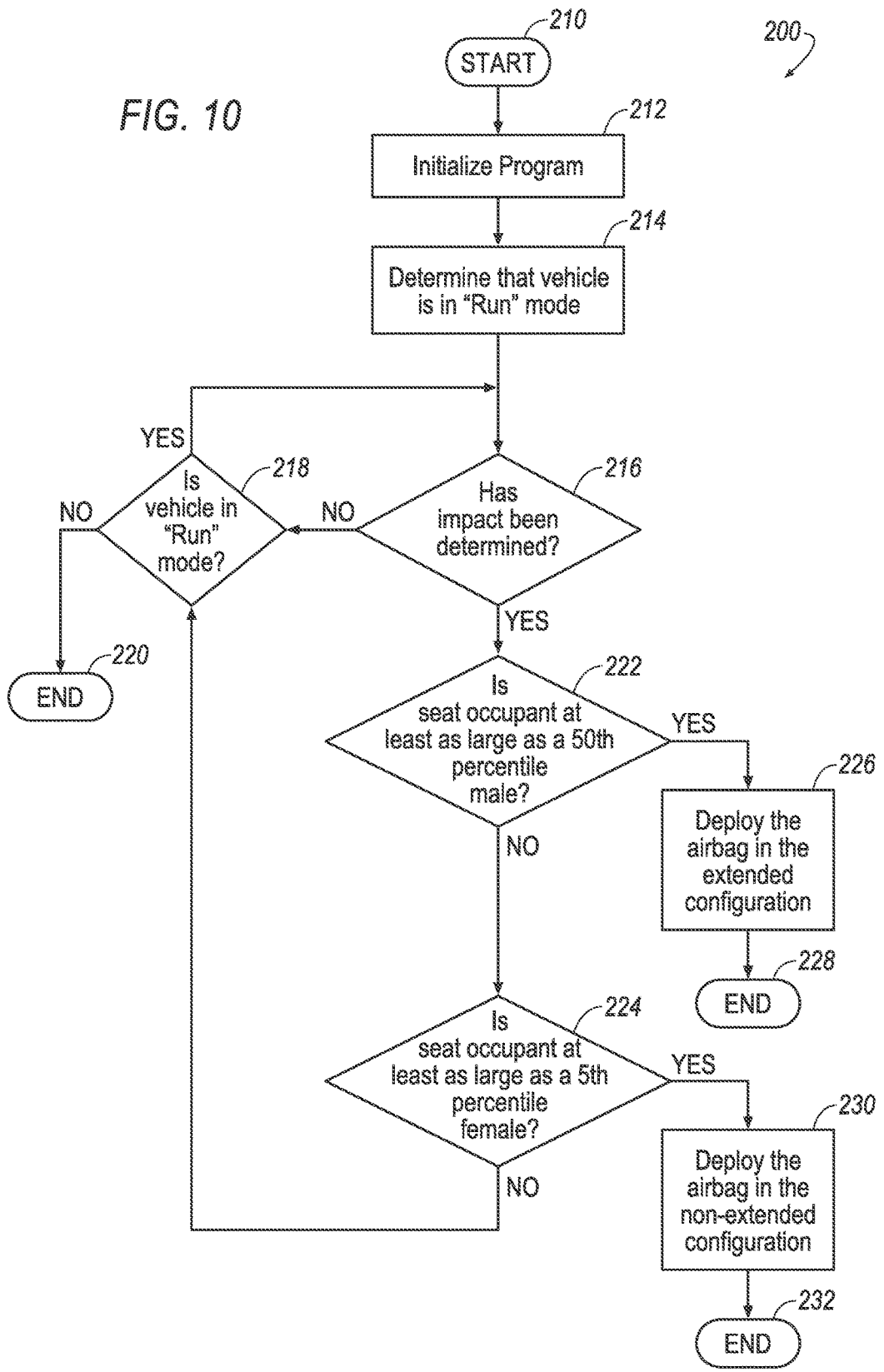

ADAPTIVE SIDE TORSO AIRBAG

BACKGROUND

Known side torso airbags provide some limited adaptive deployment ability.

BRIEF DESCRIPTION OF THE DRAWINGS

FIG. 4 is a left side view of a left side seat occupant and the exemplary airbag of FIG. 3 in an exemplary first inflated configuration with an extension not deployed.

FIG. 5 is a section view of the airbag of FIG. 4 in the direction of arrows 5.

FIG. 7 is a section view of the airbag of FIG. 6 in the direction of arrows 7.

FIG. 8 is a section view of the airbag of FIG. 6 in the direction of arrows 8.

FIG. 10 is an exemplary flowchart of exemplary logic for controlling airbag deployment.

DETAILED DESCRIPTION

Introduction

Prior art torso airbags when deployed may press a seat occupant's upper arm into their ribs, potentially causing discomfort.

An example system addressing this concern includes a side airbag comprising a first side, a second side, a main portion and an extension portion. The main portion has a recess in the first side. The extension portion is supported by and is in communication with the main portion. A first tether is between the main portion and the extension portion. A vent is disposed in the main portion and selectively is moveable from a closed orientation to an open orientation. A second tether extends from the second side to the recess.

Relative orientations and directions (by way of example, upper, lower, bottom, rearward, front, rear, back, outboard, inboard, inward, outward, lateral, let, right) are set forth in this description not as limitations, but for the convenience of the reader in picturing at least one embodiment of the structures described. Such exemplary orientations are from the perspective of an occupant seated in a driver seat, facing a dashboard.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Exemplary System Elements

Figure 1:
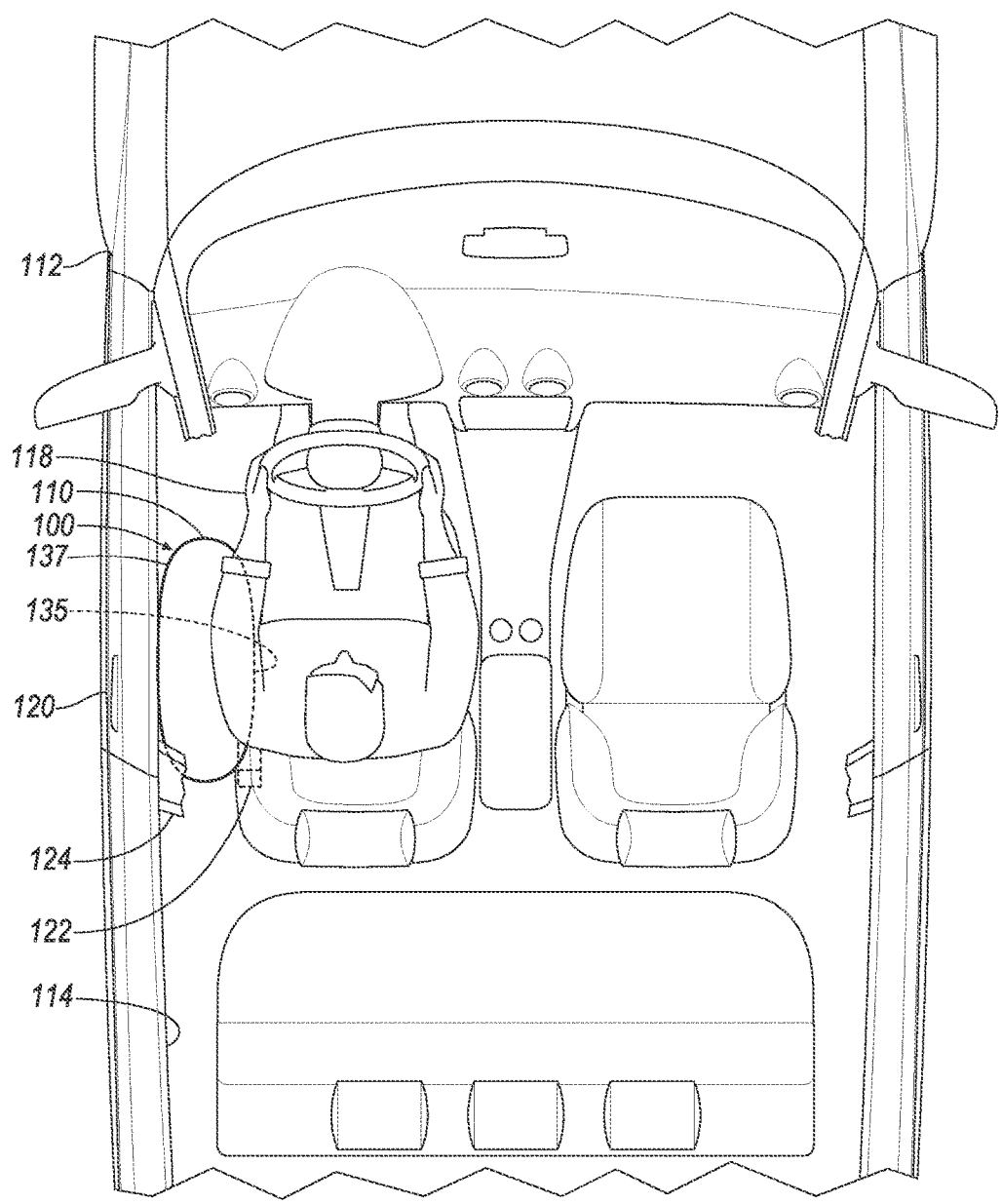
FIG. 1 is a plan view of a vehicle passenger compartment with an exemplary airbag.

As illustrated in FIG. 1, an exemplary airbag system 100 includes an exemplary adaptive side torso airbag 110 configured to be disposed inside a vehicle 112, and more specifically inside a vehicle passenger compartment 114. An exemplary front, left side seat 116 is associated with airbag 110. In a deployed condition, as illustrated in FIG. 1, airbag 110 is disposed between an exemplary seat occupant 118 and a vehicle door 120. Airbag 110, in an undeployed condition, is disposed within and part of an exemplary airbag module 122. Airbag module 122, illustrated in FIG. 2 and described in more detail below, can be disposed in either a suitable structural element of the passenger compartment 114, such as a B-pillar 124, or alternatively in a seatback of seat 116. While the present figures and description illustrate and describe airbag 110 as adapted to the front left occupant position, airbag system 100 can also include a substantially identical airbag for a rear left occupant position, and a mirror image airbag and module for a front right occupant position and a rear right occupant position. The airbag system 100 also includes an exemplary restraints control system 128 as shown in part in FIGS. 9 and 10 for controlling deployment of airbag 110 as described below. Restraints control system 128 may comprise part of a more comprehensive vehicle control system.

The construction of airbag modules like exemplary module 122 is well known in the art of airbag systems. An exemplary base bracket 130 receives airbag 110 in a deflated and folded configuration. Airbag 110 is oriented with base bracket 130 to allow airbag 110 to be inflated by a single source of pressurized gas. An exemplary tearable cover 132 prevents airbag 110 from unfolding before deployment. An inflator 134 is disposed against bracket 130 on a side opposite airbag 110. Although such a connection is not shown in the figures, inflator 134 is either directly or indirectly connected to airbag 110 to enable inflation of airbag 110 during deployment. Inflator 134 is also electrically connected, by wire or wirelessly, to restraints control system 128. Inflator 134 may be, for example, a pyrotechnic inflator that uses a chemical reaction to drive a resultant inflation medium into the airbag. Inflator 134 may alternatively be of any other suitable type including, for example, a cold-gas inflator.

Airbag 110 may be formed of any suitable airbag material, for example, a woven polymer. For example, the airbag may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

Figure 2:
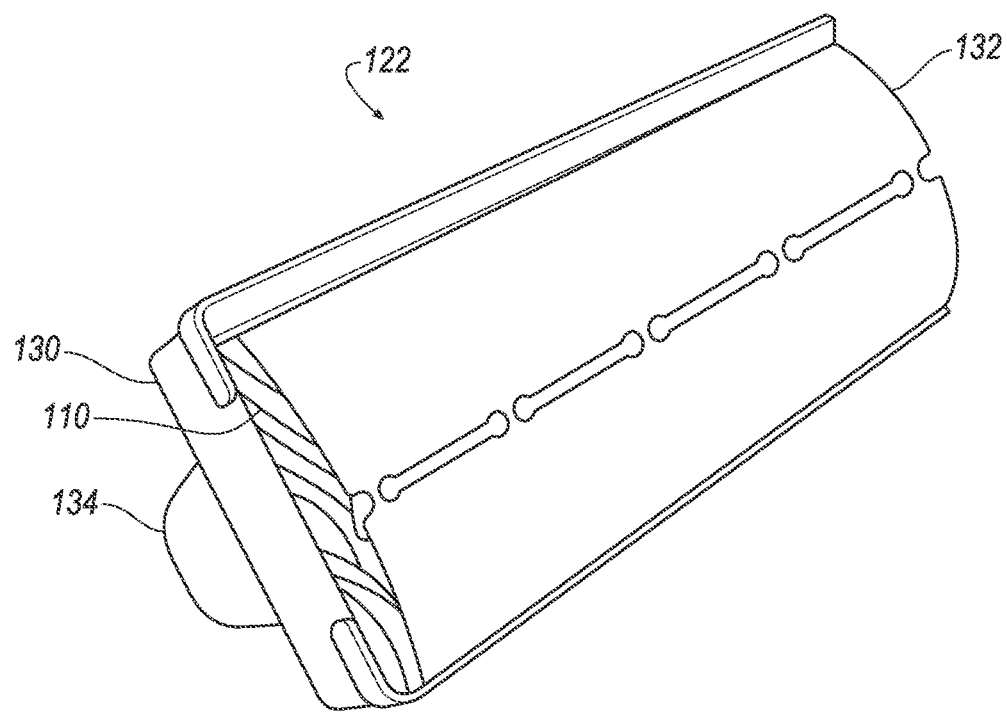
FIG. 2 is a perspective view of an exemplary airbag module incorporating the airbag of FIG. 1.
Figure 3:
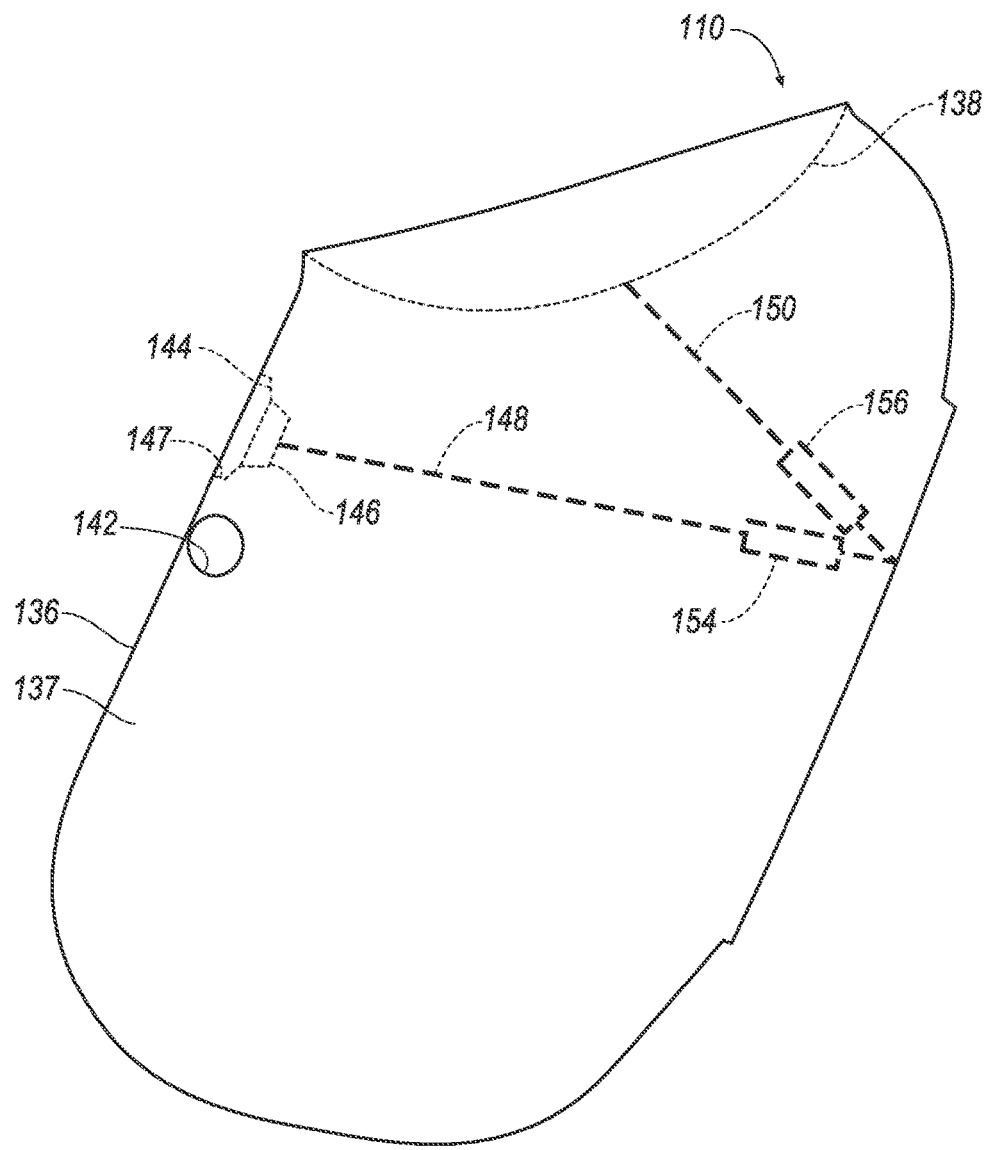
FIG. 3 is a left side view of the exemplary airbag of FIG. 1.
Figure 6:
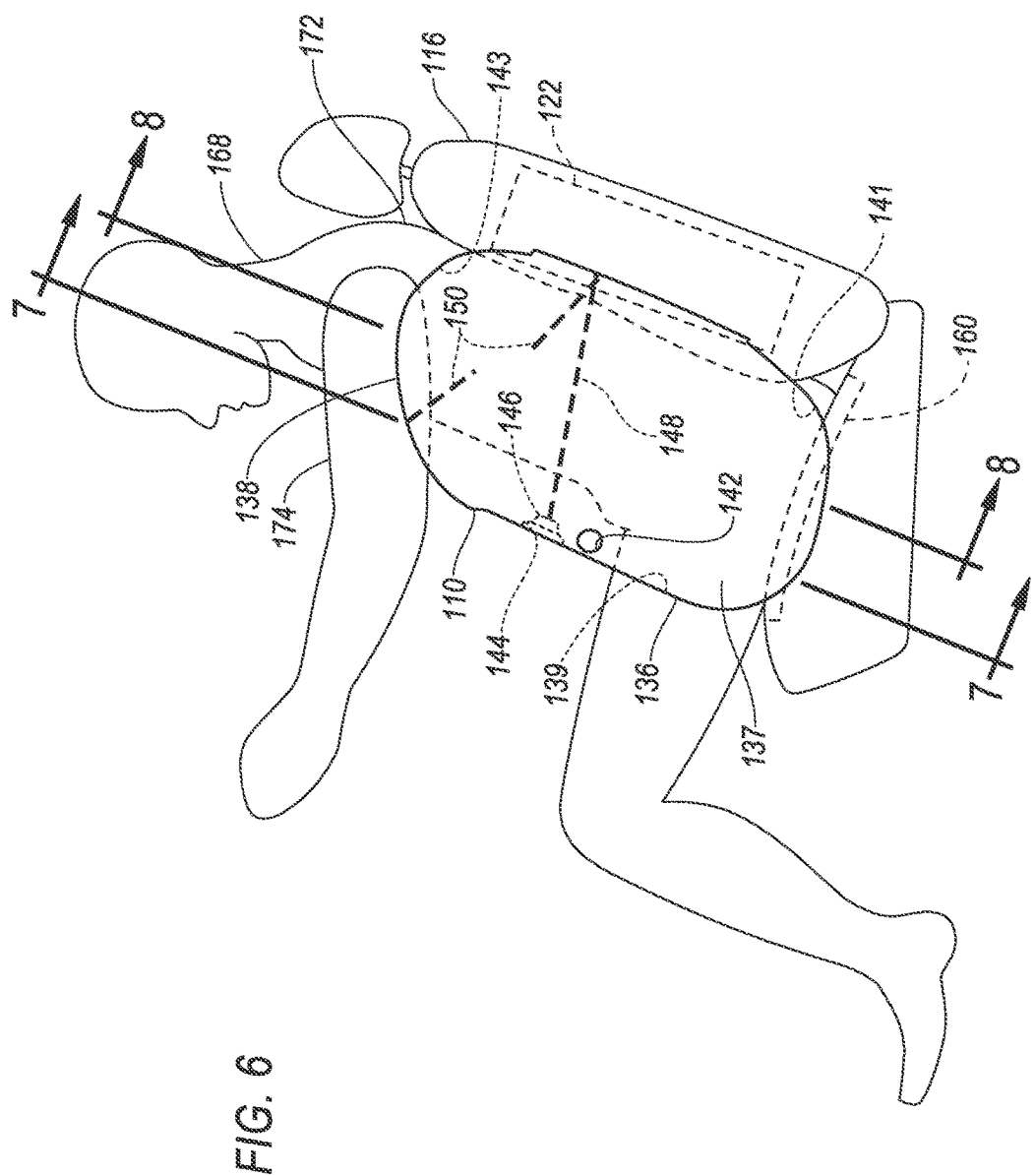
FIG. 6 is a left side view of a left side seat occupant of a second size and the exemplary airbag of FIG. 3 in an exemplary second inflated configuration with the extension deployed.

Exemplary airbag 110 is inflatable from an uninflated configuration, as shown in FIG. 2, to one of two inflated configurations, shown in FIGS. 1 and 3-8. Airbag 110 has both an inboard side or a first side 135 and an opposed outboard side or second side 137 extending from the base bracket 130 in the inflated configurations. In the inflated configurations, inboard side 135 is spaced from the outer structure elements of vehicle 112 including, by way of example, B-pillar 124 Inboard side may extend in a direction substantially parallel to a side of the vehicle 112 including the door. With reference to FIGS. 3-8, inboard side 135 is positioned to provide an impact surface of the airbag 110 directly in a path of an occupant in an offset or lateral impact and may be the surface that the occupant initially impacts during a lateral or off-set vehicle impact, protecting the occupant from impact against structure such as the door or B-pillar 124.

Airbag 110 includes a main portion 136 and an extension portion 138 substantially defined by sides 135 and 137.

Extension portion 138 is connected to and supported by main portion 136. In an uninflated configuration, extension portion 138 is disposed within main portion 136. Extension portion 138 remains disposed within main portion 136 in a first inflated configuration, and extends above main portion 136 in a second inflated configuration. Main portion 136 and extension portion 138 cooperatively define an inflation chamber 139 for receiving the inflation medium. A first portion 141 of inflation chamber 139 may be defined by the main portion 136. A second portion 143 of inflation chamber 139 may be defined by extension portion 138. Main portion 136 and extension portion 138, and thus first portion 141 and second portion 143, are in fluid communication with each other.

In the first inflated configuration illustrated in FIG. 4 and FIG. 5 and associated with smaller occupants as described in more detail below, extension portion 138 remains disposed within main portion 136 and an arm recess or depression 140 formed in inboard side 135 to support an occupant arm. In the second inflated configuration, illustrated in FIGS. 6-8 and associated with larger occupants as described in more detail below, arm recess 140 is not configured to receive an occupant arm. Instead, the occupant arm will rest on a top or superior surface of inflated extension portion 138.

Airbag 110 has vents to aid in the management of the inflation medium or gas during the deployment of airbag 110. An unrestricted opening or hole in airbag 110 defines an exemplary standard vent 142. Vent 142 provides a first flow path for gas from inflator 134 to escape airbag 110 to prevent airbag 110 from being undesirably rigid, allowing airbag 110 to more effectively dissipate energy from an impacting occupant. Vent 142 is substantially unobstructed, with flow therethrough depending on of a size of its opening. Airbag 110 also has an exemplary managed vent 144 including an exemplary vent flap 146. Vent flap 146 in a first or open condition shown in FIG. 4 provides a second flow path for gas to escape airbag 110. In a second or closed condition shown in FIG. 6, vent flap 146 is disposed over a vent opening 147, restricting the exhaust of gas from airbag 110 to just the first flow path provided by standard vent 142. Deployment or inflation of airbag 110 with flap 146 maintained in a closed position is associated with the second inflated configuration of airbag 110 in which both main portion 136 and extension portion 138 are fully deployed. Deployment or inflation of airbag 110 with flap 146 maintained in an open position and clear of opening 147, is associated with the first inflated configuration of airbag 110 in which main portion 136 is fully deployed and extension portion 138 not deployed. Extensions portion 138, when not deployed, remains disposed within main portion 136. Flap 146 may be mounted to the main portion 136 adjacent opening 147. For example flap 146 may be sewn to main portion 136. Alternatively, flap 146 may be connected to the main portion 136 in any suitable manner, e.g., fusion, adhesion, bonding, welding, fastening, etc. Flap 146 may be formed of the same type of material as the main portion 136 of the airbag 110 or may be formed of a separate material. The flap 146 may be integrally formed with the main portion 136 of the airbag 110, i.e., formed simultaneously with the main portion 136, or may be formed separately from and subsequently connected to the main portion 136.

Exemplary airbag 110 further includes three internal tethers: a vent tether 148, an extension tether 150 and a lateral tether 152. Any of the tethers may be in the form of a strap or a panel made of the same material as airbag 110. Exemplary vent tether 148 is connected on a first end to vent flap 146 and on a second end to the main portion 136 of airbag 110. Exemplary extension tether 150 is connected on a first end to at least one location of extension portion 138 in a folded position and on a second end to the main portion 136 of airbag 110. Lateral tether 152 is disposed within airbag 110 proximate to arm recess 140, and aids in defining arm recess 140 in both of the inflated configurations. Exemplary lateral tether 152 is connected on a first end to inboard side 135 and on a second end to outboard side 137 of main portion 136. In either of its inflated configurations and when installed in a vehicle, lateral tether 152 is substantially lateral in it orientation, being substantially parallel to the ground and extending left to right. Although airbag 110 is illustrated with just a single tether 152, a plurality of tethers may be disposed between inboard side 135 and outboard side 137 to further aid in defining recess 140. The ends of tethers 148, 150, and 152 are all anchored when the airbag 110 is in the uninflated configuration. The connections between the ends of tethers 148 and 150 and their respective parts of the airbag may be by sewing or any other suitable manner, including but not limited to fusion, adhesion, bonding, welding, fastening, etc.

A distance between the first end of tether 148 and the second end of tether 148 may be substantially equal to a distance between flap 146 and the first predetermined location. Such equivalence of length and distance allows tether 148 to maintain flap 146 in a closed position or orientation when airbag 110 is being deployed and when deployed. A distance between the first end of tether 150 and the second end of tether 150 may be substantially equal to a distance between the extension 138 in the folded position and the second predetermined location. Such equivalence of length and distance allows tether 150 to maintain extension 138 in the folded position when airbag 110 is being deployed and when deployed in the first inflated configuration illustrated in FIGS. 4 and 5.

Two tether releases are also disposed within a airbag 110. A vent tether release 154 is engaged with vent tether 148 and is part of restraints control system 128. An extension tether release 156 is engaged with extension tether 150 and is also part of restraints control system 128. Such electrical connections can be made with wires or wirelessly with Bluetooth or alternative technology providing similar functionality. Each of releases 154, 156 is configured to selectively release its respective tether 148, 150. Tether releases 154, 156 may be disposed anywhere along each release's respective tether 148, 150. Tethers releases 154, 156 may be disposed at the second ends of tethers 148 and 150 at the main portion 136. In such arrangements, releases 154, 156 are fixed to main portion 136. Such releases are well known in the art of airbags. One exemplary tether release including a cutter is illustrated in U.S. Pat. No. 7,690,683. The precise nature of the release is not critical to the present disclosure. Any suitable mechanism for releasing or severing a tether may be employed. The releases 154, 156, for example, may be actuated mechanically, pneumatically, hydraulically, etc. and may include pin-type releases. Based on signals from an impact sensor 158 disposed within the vehicle and from an occupant weight sensor 160 disposed in seat 116, control system 128 may provide instructions to at least one of the releases 154, 156 to release the associated tether 148, 150 to configure airbag 110 to the appropriate deployed configuration. Impact sensor 158 may sense the type of impact, e.g., based on direction, magnitude, etc. The control system 128 may also control inflator 134, i.e., provide instructions to inflator 134, to inflate airbag 110.

Figure 9:
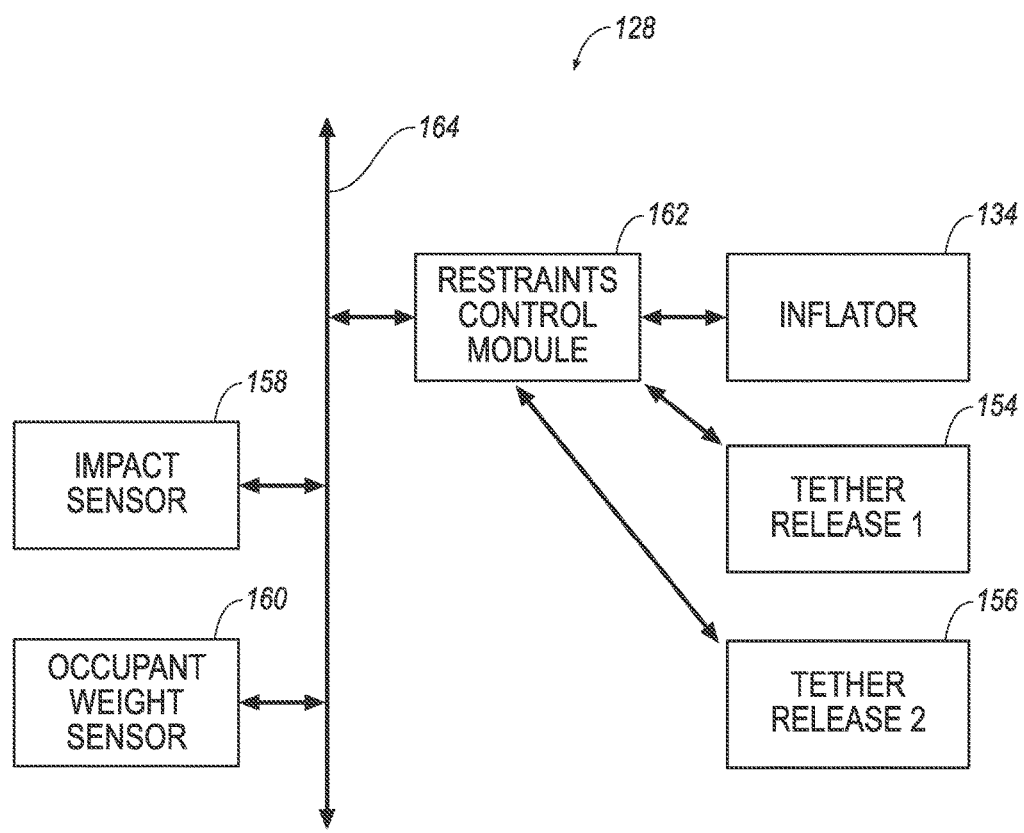
FIG. 9 is a schematic diagram of an exemplary airbag deployment control system.

The restraints control system 128 is shown schematically in FIG. 9. Control system 128 may include the impact sensor 158 and the occupant weight sensor 160. A restraints control module or controller 162 is programmed to receive signals from the impact sensor 158 and to execute the exemplary logic of FIG. 10, described in more detail below. Control system 128 may also include a system bus 164 coupled to controller 162 and sensors 158 and 160 and inflator 134 and tether releases 154, 156. Exemplary system bus 164 provides a transmission media between and connecting elements of control system 128, including controller 162, occupant weight sensor 160, impact sensor 158, tether releases 154, 156 to enable the communication of electronic control and information signals between the constituent elements.

In a small-occupant mode of deployment associated with the first inflated configuration, illustrated in FIGS. 4 and 5, controller 162 is programmed to instruct tether release 154 to release tether 148 and to maintain tether 150 in an unreleased condition. In a large-occupant mode of deployment associated with the second inflated configuration, illustrated in FIGS. 6, 7, and 8, controller 162 is programmed to instruct tether release 156 to release tether 150 and to maintain tether 148 in an unreleased condition. Such instructions are, as described in more detail below, based at least in part on the signals from an occupant sensor (not shown) and the impact sensor 158. The controller 128 may be a microprocessor-based controller. The controller 128 may include a processor, memory, etc. The memory of the controller 128 may store instructions executable by the processor.

Certain crash test dummies represented in the figures are used to simulate different sizes of people, and to react as much like the human body in a crash situation as is reasonable possible to simulate the effect of a crash on a living person of similar size. Crash test dummies considered in the evaluation of the present concepts includes a full sized dummy 168, representative of a $50^{th}$ percentile male and a smaller dummy 170 representative of a $5^{th}$ percentile female. The full sized dummy 168 is known as a WorldSID dummy, and is alternatively known as an ES2 dummy, and the smaller dummy 170 is known as a SID2s dummy. Full sized dummy 168 has a higher shoulder point, a longer torso 172, and a larger left arm 174 than a shoulder point, torso 176 and left arm 178 of the smaller dummy 170. WorldSID dummies, represent of a $50^{th}$ percentile male, are also appreciably heavier than SID2s dummies, representative of a $5^{th}$ percentile female. The precise dimensions of such dummies are available in the relevant standards such as, by way of example https://www.federalregister.gov/articles/2004/12/08/04-26753/anthropomorphic-test-devices-sid-iisfrg-side-impact-crash-test-dummy-sid-iis-with-floating-rib-guide.

Although illustrated as a sedan, vehicle 112 may include any passenger or commercial automobile such as a car, a truck, a sport utility vehicle, a crossover vehicle, a van, a minivan, a taxi, a bus, etc. Communication interfaces within the control system 128 and with airbag module 122 and it constituent elements may be configured to facilitate wired and/or wireless communication between such components and other components of the vehicle.

The mode of deployment and ultimate inflated configuration of airbag 110 depends on management of airbag vents and tethers as are described in further detail below.

Processing

Controller 162, may include programming to determine whether to deploy airbag 110, and if so, which configuration to deploy it in. FIG. 10 is a flowchart of an example process 200 incorporated by such programming that may be implemented by one or more components of system 100. In the exemplary embodiment, controller 162 assesses whether there has been an impact based on input from sensor 158 and further assesses whether there is an occupant in seat 116 and how large such occupant is, deploying airbag 110 accordingly.

Controller 162 executes a computer program incorporating exemplary process 200 as described below. The program is initiated in start block 210. The computer program is initialized in process block 212 as may occur on vehicle start-up. The program moves to process block 214 which may determine that the vehicle 112 is in a Run mode by evaluating predetermined parameters such as whether one or more seats are occupied and whether a powertrain has been activated. The program continues to decision block 216 to consider whether impact has been determined. Such a determination may be made at least in part by considering input from impact sensor 158. When a signal or lack of a signal from impact sensor 158 is determined to be not indicative of occurrence of an impact, the program moves to decision block 218 to determine if the vehicle 112 is still in the Run mode. When it is determined that vehicle 112 is no longer in the Run mode, the program moves to end block 220 and terminates. When vehicle 112 is still in the Run mode, the program cycles back to decision block 216 to assess whether impact has been determined.

When decision block 216 determines that impact has been determined, the program continues to decision block 222, the first step in assessing whether the occupant weight as measured by occupant weight sensor 160 is in a first range, in the present example, greater than or equal to a $50^{th}$ percentile male, or in a second range, in the present example, greater than or equal to a $5^{th}$ percentile female and less than a $50^{th}$ percentile male. In decision block 222 an assessment is made, based on input from occupant weight sensor 160, as to whether the seat occupant, if any, is at least as large as a $50^{th}$ percentile male. When the assessment is that the seat occupant is not so large, the program moves to decision block 224 to assess whether the seat occupant, if any, is at least as large as a $5^{th}$ percentile female. When the assessment is that the seat occupant is not so large, the program cycles back to decision block 218 to determine whether the vehicle 112 is still in the Run mode.

When decision block 222 determines that the seat occupant is at least as large as a $50^{th}$ percentile male, the program moves to process block 226 which directs the deployment of airbag 110 in its larger form with both main portion 136 and extension portion 138 fully deployed. This is achieved by the controller 162 directing second release 156 to cut or release extension tether 150, and activating inflator 134, allowing extension portion 138 to expand upward responsive to the flow of gas from inflator 134, and biasing an occupant arm, analogous to arm 174 of large dummy 168, upward. Vent tether 148 is left intact, with flap 146 in the first orientation. Following the deployment, the program moves to end block 228 and terminates.

When decision block 224 determines that the seat occupant is at least as large as a $5^{th}$ percentile female, the program moves to process block 230 which directs the deployment of airbag 110 in its smaller form with main portion 136 deployed and extension portion 138 not deployed. This is achieved by the controller 162 directing first release 154 to cut or release vent tether 148 to allow flap 146 to move to an open orientation in which it is substantially clear of the vent or does not otherwise significantly restrict the vent opening 147. The controller also activates inflator 134, and maintains extension portion 138 in its folded position. The combination of the extra venting and the restriction on extension portion 138 by tether 150 prevents extension portion 138 from deploying and expanding upward. The arm recess 140 of airbag 110, shaped in part by tether 152, cradles and lifts an occupant arm, analogous to arm 178 of small dummy 170. Following the deployment, the program moves to end block 232 and terminates.

CONCLUSION

A system and a method for deploying a side torso airbag in a suitable configuration has been disclosed.

With regard to the references to computers including controllers in the present description, computing devices such as those discussed herein generally each include instructions executable by one or more computing devices such as those identified above, and for carrying out blocks or steps of processes described above. For example, process blocks discussed above are embodied as computer executable instructions.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims. For example, the weight of the occupant could be assessed by first checking to see if the weight is in the second range, greater than or equal to a $5^{th}$ percentile female, but less than a $50^{th}$ percentile male.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A side airbag comprising:
a first side and a second side;
a main portion having a recess in the first side;
an extension portion supported by and in communication with the main portion;
a first tether between the main portion to the extension portion;
a vent disposed in the main portion and selectively moveable from a closed orientation to an open orientation and the vent further comprising a vent flap disposed over a vent opening in the closed orientation and the vent flap being substantially clear of the vent opening when the vent is in the open orientation;
a second tether extending from the second side to the recess;
a third tether connecting the valve flap and the main portion;
a first tether release connected to the first tether and configured to selectively release the first tether; and
a second tether release connected to the third tether and configured to selectively release the third tether;
wherein in a first inflated configuration the third tether is released and the first tether is not released and in a second inflated configuration the first tether is released and the third tether is not released.

2. The airbag as set forth in claim 1 wherein a constantly open vent is disposed in the main portion.

3. An adaptive side torso airbag comprising:
an airbag including:
a main portion and an extension portion substantially defined by a first side and second side,
the main portion having a recess in the first side,
the extension portion supported by and in communication with the main portion,
a first tether between the main portion and the extension portion,
a vent disposed in the main portion and selectively moveable from a closed orientation to an open orientation and the vent further comprising a vent flap disposed over a vent opening in the closed orientation and the vent flap being substantially clear of the vent opening when the vent is in the open orientation,
a second tether extending from the second side to the recess,
a third tether connecting the valve flap and the main portion,
a first tether release connected to the first tether and configured to selectively release the first tether, and
a second tether release connected to the third tether and configured to selectively release the third tether;
an inflator in communication with the airbag; and
a base receiving the airbag in a folded configuration and receiving the inflator;
wherein in a first inflated configuration the third tether is released and the first tether is not released and in a second inflated configuration the first tether is released and the third tether is not released.

4. The airbag system as set forth in claim 3 wherein a constantly open vent is disposed in the main portion.

5. A method comprising:
providing an airbag system including:
an airbag including:
a main portion and an extension portion substantially defined by a first side and second side,
the main portion having a recess in the first side,
the extension portion supported by and in communication with the main portion,
a first tether between the main portion and the extension portion,
a vent disposed in the main portion and selectively moveable from a closed orientation to an open orientation, and
a second tether extending from the second side to the recess
a third tether connecting the vent and the main portion;
an inflator in communication with the airbag; and
a base receiving the airbag in a folded configuration and receiving the inflator;
providing an impact sensor;
providing an occupant weight sensor;
determining that an impact has occurred;
determining when a seat occupant weight is in a first value range;
when an impact has been the determined and the seat occupant weight is in the first value range actuating the inflator and releasing the first tether to deploy the airbag in an extended configuration;
determining when a seat occupant weight is in a second value range;
when an impact has been determined and the seat occupant weight is in the second value range actuating the inflator and releasing the third tether.

6. The method as set forth in claim 5, wherein the vent further includes a vent flap disposed over a vent opening in the closed orientation and the vent flap is substantially clear of the vent opening when the vent is in the open orientation.

7. The method as set forth in 6 wherein the third tether connects the valve flap and the main portion.

8. The method as set forth in claim 7 wherein:
the assembly further includes:
a first tether release connected to the first tether and configured to selectively release the first tether; and
a second tether release connected to the third tether and configured to selectively release the third tether;

wherein in a first inflated configuration the third tether is released and the first tether is not released and in a second inflated configuration the first tether is released and the third tether is not released.

9. The method as set forth in claim 8 wherein the assembly further includes a constantly open vent disposed in the main portion.

\* \* \* \* \*